(12) United States Patent
Nagase et al.

(10) Patent No.: US 8,825,288 B2
(45) Date of Patent: Sep. 2, 2014

(54) CONTROL APPARATUS

(71) Applicant: Aisin Seiki Kabushiki Kaisha, Kariya (JP)

(72) Inventors: Koji Nagase, Toyota (JP); Nobuyasu Bessho, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/744,678

(22) Filed: Jan. 18, 2013

(65) Prior Publication Data

US 2013/0190974 A1 Jul. 25, 2013

(30) Foreign Application Priority Data

Jan. 20, 2012 (JP) ................................. 2012-010349

(51) Int. Cl.
*B60J 7/047* (2006.01)
*G06F 19/00* (2011.01)

(52) U.S. Cl.
USPC ........................................... 701/36; 296/214

(58) Field of Classification Search
USPC ................ 701/36, 1; 296/211, 214, 97.8, 223
See application file for complete search history.

(56) References Cited

U.S. PATENT DOCUMENTS

| | | | | |
|---|---|---|---|---|
| 5,250,882 A | * | 10/1993 | Odoi et al. .................... | 318/467 |
| 6,056,352 A | * | 5/2000 | Ewing et al. .................. | 296/214 |
| 6,481,787 B1 | * | 11/2002 | Laux et al. .................... | 296/214 |
| 8,282,157 B2 | * | 10/2012 | Kato et al. .................... | 296/214 |
| 8,303,031 B2 | | 11/2012 | Horiuchi et al. | |
| 2006/0066141 A1 | | 3/2006 | Fuchs et al. | |

FOREIGN PATENT DOCUMENTS

| | | |
|---|---|---|
| DE | 102 12 006 | 10/2003 |
| DE | 10 2004 041 168 | 3/2006 |
| JP | 4-293617 | 10/1992 |
| JP | 7-276993 | 10/1995 |
| JP | 3339695 | 8/2002 |
| JP | 4153821 | 7/2008 |
| JP | 2011-11735 | 1/2011 |

OTHER PUBLICATIONS

K. Nagase et al., U.S. Appl. No. 13/661,179, "Opening-And-Closing Member Control Apparatus", filed Oct. 26, 2012.
Extended European Search Report for EP Appl. No. 13151913.4 dated May 17, 2013.

* cited by examiner

*Primary Examiner* — Tan Q Nguyen
(74) *Attorney, Agent, or Firm* — Finnegan, Henderson, Farabow, Garrett & Dunner, LLP

(57) ABSTRACT

A control apparatus includes a first drive device driving a movable panel, a first detection device detecting a state of the movable panel, a second drive device driving a sunshade, a second detection device detecting a state of the sunshade, and a control device controlling one of the first and second drive devices to stop an operation of a succeeding member serving as one of the movable panel and the sunshade configured to be positioned behind a preceding member serving as the other of the movable panel and the sunshade relative to each of the opening position and the closing position, in a case where a distance between the movable panel and the sunshade becomes smaller than a predetermined distance on a basis of a position of the movable panel detected by the first drive device and a position of the sunshade detected by the second drive device.

4 Claims, 5 Drawing Sheets

CONTROL APPARATUS

CROSS REFERENCE TO RELATED APPLICATIONS

This application is based on and claims priority under 35 U.S.C. §119 to Japanese Patent Application 2012-010349, filed on Jan. 20, 2012, the entire content of which is incorporated herein by reference.

TECHNICAL FIELD

This disclosure generally relates to a control apparatus for an opening and closing member.

BACKGROUND DISCUSSION

Various types of control apparatus for an opening and closing member, for example, a movable panel and a sunshade, are known. For example, a control apparatus for an opening and closing member (a sunroof apparatus) is disclosed in JP3339695B, which will be hereinafter referred to as Reference 1. The control apparatus disclosed in Reference 1 is not provided with a structure for mechanically moving a movable panel and a sunshade in conjunction with each other, which results in downsizing of the sunroof apparatus in a vertical direction of a vehicle. A panel opening/closing motor for driving the movable panel to open and close, and a sunshade opening/closing motor for driving the sunshade to open and close are separately driven and controlled. According to the control apparatus disclosed in Reference 1, the sunshade moves in an opening direction electrically in conjunction with the movement of the movable panel in the opening direction (the movement in the opening direction will be hereinafter referred to as an opening operation). In addition, in a case where a sunshade operation button is pressed for closing the sunshade by a user while the movable panel is being opened, the movement of the sunshade in a closing direction (the movement in the closing direction will be hereinafter referred to as a closing operation) is restricted. As a result, the movable panel is inhibited from being forgotten to be closed when the sunshade is closed while the movable panel is being opened.

In addition, according to a control apparatus for an opening and closing member disclosed in JP2011-11735A, which will be hereinafter referred to as Reference 2, a movable panel is configured to close electrically in conjunction with a closing operation of a sunshade in a case where the movable panel (roof panel) and the sunshade (sunshade panel) are opened.

Further, according to a control apparatus for an opening and closing member disclosed in JP4153821B, which will be hereinafter referred to as Reference 3, a sunshade is independently opened by a user to operate a sunshade opening switch (operation switch) and the sunshade is independently closed by the user to operate a panel closing switch (operation switch) in a case where a movable panel (slide panel) is in a fully closed state. According to the control apparatus disclosed in Reference 3, the movable panel and the sunshade are configured to open together by the user to operate a panel opening switch (operation switch). In a case where the movable panel is opened, the sunshade is inhibited from being closed independently.

According to the control apparatus disclosed in each of References 1 to 3, the movable panel and the sunshade are operated electrically in conjunction with each other by the operation of the operation switch on the condition that the movable panel and the sunshade are basically stopped. Therefore, after the movable panel and the sunshade start moving, a subsequent moving status of each of the movable panel and the sunshade is not specially monitored or detected. Consequently, in a case where the operations of the movable panel and the sunshade in conjunction with each other (i.e., an interlock operation of the movable panel and the sunshade) are stopped, a position of one of the movable panel and the sunshade in the opening or closing direction, which should precede a position of the other of the movable panel and the sunshade in the opening or closing direction, may be behind the position of the other of the movable panel and the sunshade (which will be hereinafter referred to as a reversal position relation).

According to the control apparatus disclosed in Reference 3, the movable panel and the sunshade are freely opened or closed by the user to operate the panel opening switch, the panel closing switch, or the sunshade opening switch except for the aforementioned circumstances where the operation of the sunshade or the movable panel is limited or restricted. Thus, in a case where the movable panel or the sunshade operating independently (i.e., an independent operation of the movable panel or the sunshade) is stopped, possibility of establishment of the aforementioned reversal position relation may further increase between the positions of the movable panel and the sunshade in the opening or closing direction. According to the control apparatus disclosed in each of References 1 and 2, the possibility of establishment of the aforementioned reversal position relation may also further increase between the positions of the movable panel and the sunshade in the opening or closing direction in a case where each of the movable panel and the sunshade operating independently is stopped. Nevertheless, the independent operation of each of the movable panel and the sunshade is necessary so as to conform to user's various usages, for example, the usage for only opening the sunshade for the purpose of lighting or the usage for only and partially closing the sunshade for the purpose of light blocking in a state where the movable panel and the sunshade are fully opened.

FIG. 7 is a diagram for explaining the reversal position relation. An opening amount AP1 of a panel opening portion formed by a movable panel 91 is smaller than an opening amount AP2 of a shade opening portion formed by a sunshade 92 in a state where the reversal position relation is established. Thus, when the sunshade 92 is brought to a fully closed state with the movable panel 91 being opened in a case where the closing operation of each of the movable panel and the sunshade is stopped, the state of the movable panel 91 is inhibited from visually confirmed from an interior side of the vehicle. For example, the user may wrongly recognize that the movable panel 91 and the sunshade 92 are both fully closed. In addition, in a case where the closing operation of the movable panel 91 is stopped due to a malfunction of the movable panel 91 or a detection of an obstruction at the movable panel 91, for example, the movable panel 91 is left opened, which may lead to a damage of the sunshade 92 by rain or dirt. Further, when the movable panel 91 is brought to a fully open state with the sunshade 92 being partially opened in a case where the opening operation of each of the movable panel and the sunshade is stopped, the sunshade 92 may flap by receiving wind while the vehicle is being driven and generate an abnormal sound.

The aforementioned reversal position relation is generated, for example, by a difference between rotation speeds of motors for the movable panel 91 and the sunshade 92. The difference between the rotation speeds of the motors is caused, even when specifications of the motors for the movable panel 91 and the sunshade 92 are the same, by variations in motor characteristics, variations in mechanical configurations, a difference between slide resistances of the operations, or a difference of motor temperature characteristics, for example. In order to conform the rotation speeds of the motors for the movable panel 91 and the sunshade 92 to each other, a long analysis time may be necessary.

According to a control apparatus for an opening and closing member (sunroof apparatus) disclosed in JP04-293617A, which will be hereinafter referred to as Reference 4, a movable panel and a sunshade are operated to open and close electrically in conjunction with each other. In a case where the movable panel and the sunshade are both fully closed, the start of the opening operation of the movable panel is delayed by a predetermined time period relative to the start of the opening operation of the sunshade. In a case where the movable panel and the sunshade are both fully opened, the start of the closing operation of the sunshade is delayed by a predetermined time period relative to the start of the closing operation of the movable panel. Accordingly, the sunshade is operated ahead of the movable panel in a case where the sunshade and the movable panel are opening. In a case where the sunshade and the movable panel are closing, the movable panel is operated ahead of the sunshade.

A control apparatus for an opening and closing member disclosed in JP07-276993A, which will be hereinafter referred to as Reference 5, tilt and slide operations of the movable panel and tilt and slide operations of the sunshade are operated electrically in conjunction with each other. Specifically, a predetermined delay time is specified for the tilt operations of the movable panel and the sunshade, for example, so as to operate the movable panel and the sunshade electrically in conjunction with each other.

According to the control apparatus disclosed in each of References 4 and 5, the movable panel and the sunshade are on the condition that each of them is in a specific state, for example, in a fully closed, fully opened, or tilted state. Therefore, the establishment of the aforementioned reversal position relation may not be cancelled at the stop of the interlock operation of the movable panel and the sunshade. In addition, a method for cancelling establishment of the reversal position relation is not provided for the independent operation of the movable panel or the sunshade. The control apparatus disclosed in each of References 4 and 5 is intended to control the movable panel and the sunshade in a case where the movable panel and the sunshade are operated in conjunction with each other.

A need thus exists for a control apparatus which is not susceptible to the drawback mentioned above.

SUMMARY

According to an aspect of this disclosure, a control apparatus includes a first drive device driving a movable panel that moves between an opening position and a closing position to selectively open and close an opening portion configured to be formed at a vehicle, a first detection device detecting a state of the movable panel that moves to one of the opening position and the closing position, a second drive device driving a sunshade configured to be provided at the vehicle and moving between an opening position and a closing position, a second detection device detecting a state of the sunshade that moves to one of the opening position and the closing position, and a control device controlling one of the first drive device and the second drive device to stop an operation of a succeeding member serving as one of the movable panel and the sunshade configured to be positioned behind a preceding member serving as the other of the movable panel and the sunshade relative to each of the opening position and the closing position, the preceding member being configured to be positioned ahead of the succeeding member relative to each of the opening position and the closing position, in a case where a distance between the movable panel and the sunshade becomes smaller than a predetermined distance on a basis of a position of the movable panel detected by the first drive device and a position of the sunshade detected by the second drive device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1A:
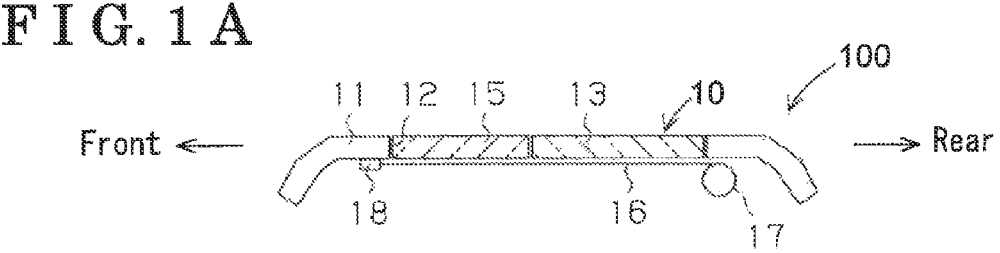
FIGS. 1A, 1B, and 1C are side views schematically illustrating a sunroof apparatus to which a control apparatus according to an embodiment disclosed here is applied.
Figure 1B:
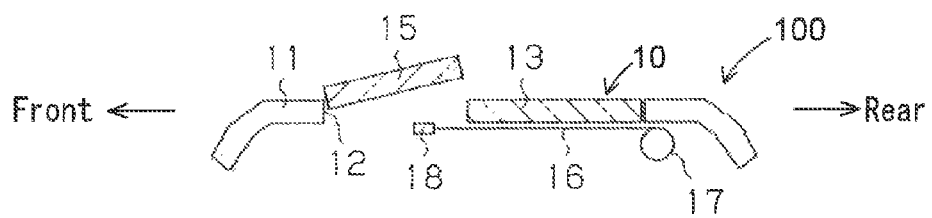
Figure 1C:
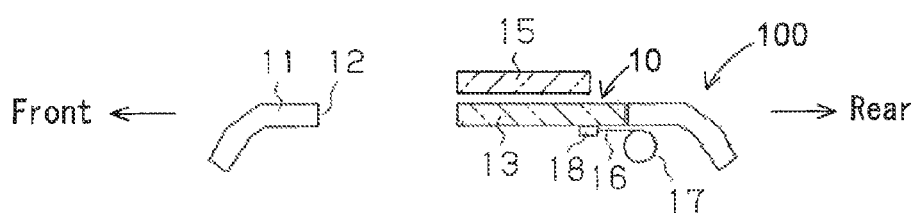

An embodiment will be explained with reference to FIGS. 1 to 6. In the embodiment, directions and orientations, for example, front, rear, upper and lower, correspond to those of a vehicle. As illustrated in FIGS. 1A, 1B, and 1C, a sunroof apparatus 10 serving as an opening and closing member is mounted to a roof portion 11 of a vehicle body (i.e., a vehicle 100) at which an opening 12 serving as an opening portion and having a substantially rectangular shape is formed. A fixed panel 13 formed by a glass plate and having a substantially rectangular form is also arranged at the roof portion 11 so as to be positioned at a rear side of the opening 12. The sunroof apparatus 10 includes a movable panel 15 formed by a glass panel, for example, and a sunshade 16 made of a fabric material, for example. The movable panel 15 having a substantially rectangular form moves in a front-rear direction of the vehicle to selectively open and close the opening 12. The sunshade 16 having a substantially rectangular strip form is rolled up and out in the front-rear direction at a lower side of the opening 12 and the fixed panel 13 to thereby selectively open and close the opening 12.

The movable panel 15 is supported by a pair of functional brackets at both edges in a width direction of the vehicle. For example, when the functional brackets move in a rearward direction of the vehicle in a state where the movable panel 15 is in a fully closed state as illustrated in FIG. 1A, the movable panel 15 pivots or rotates about a front portion thereof in one direction in such a manner that a rear portion moves upward as illustrated in FIG. 1B, i.e., the movable panel 15 performs a tilt-up operation. Then, when the functional brackets continuously move in the rearward direction of the vehicle, the movable panel 15 pivots or rotates about the front portion in the other direction in such a manner that the rear portion moves downward until the movable panel 15 is positioned substantially in parallel with the fixed panel 13 at an upper side thereof, i.e., the movable panel 15 performs a tilt-down operation. While being kept substantially parallel to the fixed panel 13, the movable panel 15 slides, i.e., performs a slide operation, in the rearward direction to be brought to a fully open state as illustrated in FIG. 1C.

When the functional brackets move in a forward direction of the vehicle in a state where the movable panel 15 is in a fully open state as illustrated in FIG. 1C, the movable panel 15 slides in the forward direction while being kept substantially parallel to the fixed panel 13 to a position where the movable panel 15 completes the tilt-down operation. Then, when the functional brackets continuously move in the forward direction of the vehicle, the movable panel 15 once performs the tilt-up operation as illustrated in FIG. 1B and thereafter performs the tilt-down operation as illustrated in FIG. 1A so as to be brought to the fully closed state.

Accordingly, a movable range of each of the functional brackets in the front-rear direction ranges from a foremost position corresponding to the fully closed state (fully closed position) of the movable panel 15 to a rearmost position corresponding to the fully open state (fully open position) of the movable panel 15. The tilt-up operation and the tilt-down operation of the movable panel 15 are established while the functional brackets are moving between the foremost position and the rearmost position. The slide operation of the movable panel 15 is a so-called pop-up operation in which the movable panel 15 moves substantially in parallel with the fixed panel 13 at the upper side of the fixed panel 13 (i.e., the roof portion 11).

A rear and portion of the sunshade 16 is fixed to a roll-up shaft 17 having a substantially cylindrical form and extending in the vehicle width direction. Both edges of a front end portion of the sunshade 16 in the vehicle width direction are connected to a pair of slide members 18. In a case where the pair of slide members 18 moves in the rearward direction when the sunshade 16 is in a fully closed state as illustrated in FIG. 1A, the sunshade 16 is brought to a state illustrated in FIG. 1B and then to a fully open state as illustrated in FIG. 1C so as to be retracted to a rear portion of the vehicle 100 while the sunshade 16 is maintained substantially in parallel with the roof portion 11 and a sagging portion of the sunshade 16 is rolled up by the roll-up shaft 17. At this time, the opening 12 and an area where the fixed panel 13 is provided are inhibited from being covered by the sunshade 16 as illustrated in FIG. 1C. A biasing member is incorporated in the roll-up shaft 17 for constantly biasing the sunshade 16 to be rolled up.

On the other hand, in a case where the pair of slide members 18 moves in the forward direction when the sunshade 16 is in the fully open state as illustrated in FIG. 1C, the sunshade 16 is brought to the state illustrated in FIG. 1B and then to the fully closed state as illustrated in FIG. 1A so as to be deployed to a front portion of the vehicle 100 while the sunshade 16 is maintained substantially in parallel with the roof portion 11 and is rolled out from the roll-up shaft 17. At this time, the opening 12 and the area where the fixed panel 13 is provided are blocked or covered by the sunshade 16.

Accordingly, a movable range of each of the slide members 18 in the front-rear direction of the vehicle ranges from a foremost position corresponding to the fully closed state (fully closed position) of the sunshade 16 to a rearmost position corresponding to the fully open state (fully open position) of the sunshade 16.

Figure 3:
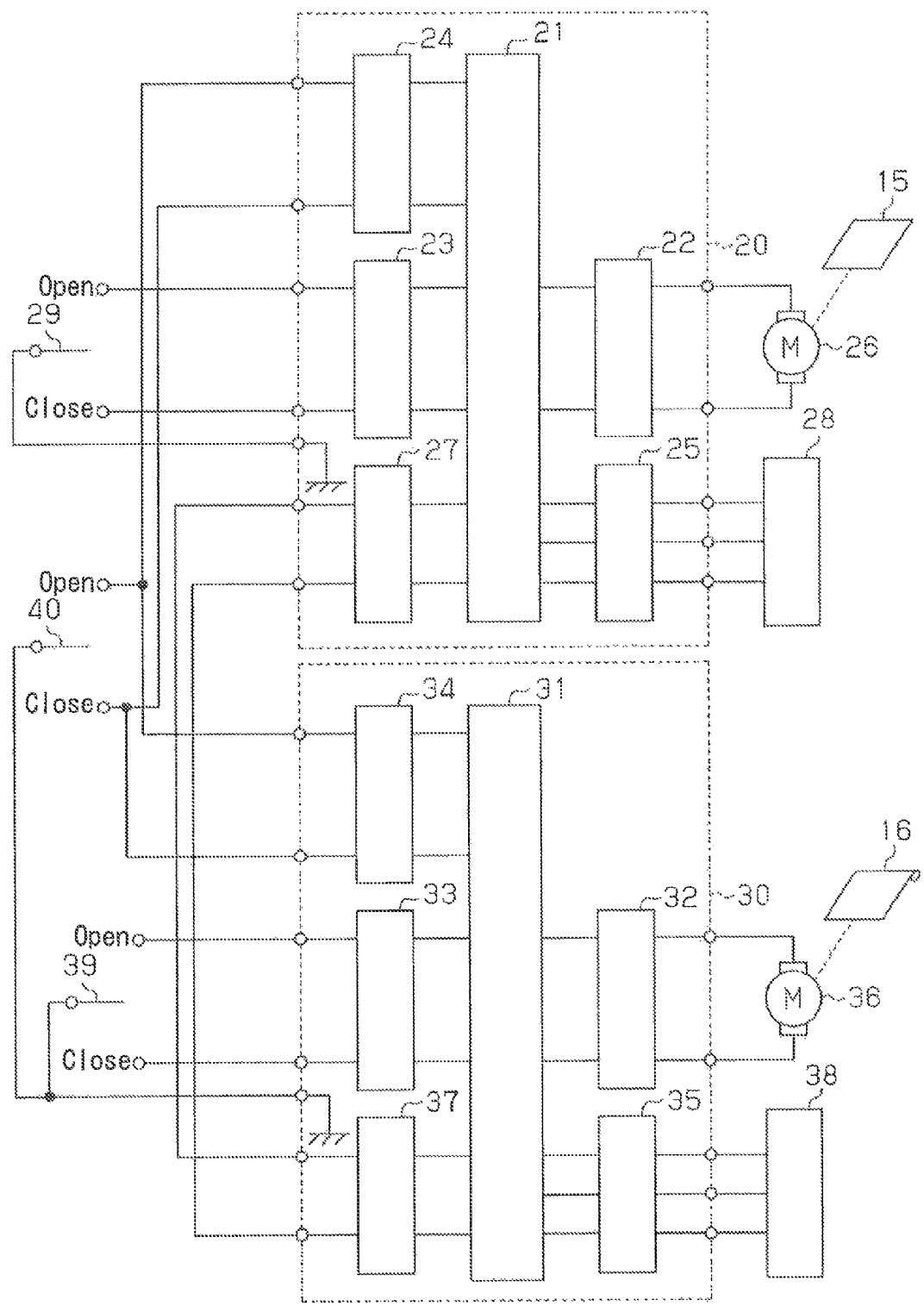
FIG. 3 is a block diagram illustrating an electric configuration of the control apparatus according to the embodiment.

Next, an electrical configuration of the control apparatus according to the embodiment will be explained. As illustrated in FIG. 3, the sunroof apparatus 10 includes a panel control unit 20 serving as the control apparatus for controlling an opening and closing operation of the movable panel 15. The panel control unit 20 includes a CPU (central processing unit) 21, a drive circuit 22, input circuits 23, 24, 25, and a communication circuit 27. The drive circuit 22, the input circuits 23, 24, 25, and the communication circuit 27 are electrically connected to the CPU 21. The CPU 21 integrally includes, for example, a ROM storing various control programs related to computing of the CPU 21, a RAM temporarily storing various data (for example, computing results), and a timer.

The CPU 21 is connected via the drive circuit 22 to a panel drive motor 26 serving as a first drive device. The drive circuit 22 switches or reverses a polarity of a battery voltage applied to the panel drive motor 26 on a basis of a duty value DUTY output from the CPU 21. In addition, the drive circuit 22 changes an on/off ratio, i.e., a duty ratio, so that the battery voltage is applied or not applied to the panel drive motor 26. That is, a rotation direction of the panel drive motor 26, i.e., a normal or reverse rotation, is controlled because the polarity of the battery voltage applied to the panel drive motor 26 is controlled on a basis of the duty value DUTY output from the CPU 21. In addition, an average voltage applied to the panel drive motor 26, i.e., a rotation speed Np of the panel drive motor 26, is controlled because the duty ratio is controlled (i.e., PWM control is conducted) on a basis of the duty value DUTY output from the CPU 21.

The panel drive motor 26 is mechanically connected to the movable panel 15 (specifically, the functional brackets). The movable panel 15 performs the opening operation or the closing operation, i.e., moves in an opening direction serving as an opening position or a closing direction serving as a closing position, depending on the rotation direction of the panel drive motor 26 that is driven to rotate. Accordingly, a rotation position Ap of the panel drive motor 26 basically one-to-one corresponds to an opened/closed state, i.e., an opened/closed position, of the movable panel 15. In addition, a rotation range of the panel drive motor 26 ranges from a foremost rotation position FMp corresponding to the foremost position of the functional bracket (the fully closed state of the movable panel 15) to a rearmost rotation position RMp (which is greater than FMp) corresponding to the rearmost position of the functional bracket (the fully open state of the movable panel 15).

The CPU 21 is connected via the input circuit 23 to a panel opening and closing operation switch (which will be hereinafter simply referred to as a panel operation switch) 29 for opening and closing the movable panel 15. The CPU 21 detects whether or not the opening or closing operation of the movable panel 15 is intended by a user, for example, on a basis of a signal from the panel operation switch 29. In a case where the panel operation switch 29 is operated for opening the movable panel 15, the CPU 21 drives and controls the panel drive motor 26 so that the movable panel 15 performs the opening operation (i.e., an independent operation of the movable panel 15). In a case where the panel operation switch 29 is operated for closing the movable panel 15, the CPU 21 drives and controls the panel drive motor 26 so that the movable panel 15 performs the closing operation.

The CPU 21 is also connected via the input circuit 25 to a pulse sensor 28 serving as a first detection device. The CPU 21 detects the rotation position Ap and the rotation speed Np of the panel drive motor 26 based on a pulse signal from the pulse sensor 28. The pulse sensor 28 includes a pair of hall elements arranged to face an outer circumferential surface of an annular magnet that is rotatably driven by the panel drive motor 26, the polarity, i.e., north and south poles, of the outer circumferential surface of the magnet switching per predetermined angle. Pulse signals having different phases are output from the hall elements each time the magnet, i.e., the panel drive motor 26, rotates by the predetermined angle. Accordingly, the CPU 21 counts rising edges or falling edges of one of the pulse signals, thereby detecting the rotation position Ap of the panel drive motor 26. In addition, the CPU 21 detects the rotation speed Np of the panel drive motor 26 based on a time interval of the rising edges or the falling edges while detecting the rotation direction (i.e., the normal or reverse rotation) of the panel drive motor 26 based on the phase difference between the pulse signals. The rotation position Ap, the rotation speed Np, and the rotation direction of the panel drive motor 26 basically one-to-one correspond to (synchronized with) the opened/closed position, the opening/closing speed, and the opening/closing direction of the movable panel 15.

The CPU 21 is further connected via the communication circuit 27 to a sunshade control unit 30 serving as the control apparatus for controlling an opening and closing operation of the sunshade 16. The sunshade control unit 30 includes a CPU 31, a drive circuit 32, input circuits 33, 34, 35, and a communication circuit 37. The drive circuit 32, the input circuits 33, 34, 35, and the communication circuit 37 are electrically connected to the CPU 31. The CPU 31 is connected to the communication circuit 27 of the panel control unit 20 via the communication circuit 37.

The CPU 31 is connected via the drive circuit 32 to a sunshade drive motor 36 serving as a second drive device. The drive circuit 32 switches or reverses a polarity of a battery voltage applied to the sunshade drive motor 36 on a basis of a duty value DUTY output from the CPU 31. In addition, the drive circuit 32 changes an on/off ratio, i.e., a duty ratio, so that the battery voltage is applied or not applied to the sunshade drive motor 36. That is, a rotation direction of the sunshade drive motor 36, i.e., a normal or reverse rotation, is controlled because the polarity of the battery voltage applied to the sunshade drive motor 36 is controlled on a basis of the duty value DUTY output from the CPU 31. In addition, an average voltage applied to the sunshade drive motor 36, i.e., a rotation speed Ns of the sunshade drive motor 36, is controlled because the duty ratio is controlled on a basis of the duty value DUTY output from the CPU 31.

The sunshade drive motor 36 is mechanically connected to the sunshade 16 (specifically, the slide members 18). The sunshade 16 performs the opening operation or the closing operation, i.e., moves in an opening direction serving as an opening position or a closing direction serving as a closing position, depending on the rotation direction of the sunshade drive motor 36 that is driven to rotate. Accordingly, a rotation position As of the sunshade drive motor 36 basically one-to-one corresponds to an opened/closed state, i.e., an opened/closed position, of the sunshade 16. In addition, a rotation range of the sunshade drive motor 36 ranges from a foremost rotation position FMs corresponding to the foremost position of the slide member 18 (the fully closed state of the sunshade 16) to a rearmost rotation position RMs (which is greater than FMs) corresponding to the rearmost position of the slide member 18 (the fully open state of the sunshade 16).

The CPU 31 is connected via the input circuit 33 to a sunshade opening and closing operation switch (which will be hereinafter simply referred to as a shade operation switch) 39 for opening and closing the sunshade 16. The CPU 31 detects whether or not the opening or closing operation of the sunshade 16 is intended by a user, for example, on a basis of a signal from the shade operation switch 39. In a case where the shade operation switch 39 is operated for opening the sunshade 16, the CPU 31 drives and controls the sunshade drive motor 36 so that the sunshade 16 performs the opening operation (i.e., an independent operation of the sunshade 16). In a case where the shade operation switch 39 is operated for closing the sunshade 16, the CPU 31 drives and controls the sunshade drive motor 36 so that the sunshade 16 performs the closing operation.

The CPU 31 is also connected via the input circuit 35 to a pulse sensor 38 serving as a second detection device. The CPU 31 detects the rotation position As, the rotation speed Ns, and the rotation direction of the sunshade drive motor 36 based on a pulse signal from the pulse sensor 38. A construction of the pulse sensor 38 is the same as that of the pulse sensor 28. Therefore, the rotation position As, the rotation speed Ns, and the rotation direction of the sunshade drive motor 36 basically one-to-one correspond to (synchronized with) the opened/closed position, the opening/closing speed, and the opening/closing direction of the sunshade 16.

The CPUs 21 and 31 are both connected to an interlock opening and closing operation switch (which will be hereinafter simply referred to as an interlock operation switch) 40 via the input circuits 24 and 34 respectively. The CPUs 21 and 31 detect whether or not the opening or closing operation of the movable panel 15 and the opening or closing operation of the sunshade 16 are intended by a user, for example on a basis of a signal from the interlock operation switch 40. In a case where the interlock operation switch 40 is operated for opening the movable panel 15 and the sunshade 16, the CPUs 21 and 31 drive and control the panel drive motor 26 and the sunshade drive motor 36 respectively so that the movable panel 15 and the sunshade 16 perform the opening operation in conjunction with each other (i.e., an interlock operation of the movable panel 15 and the sunshade 16). In addition, in a case where the interlock operation switch 40 is operated for closing the movable panel 15 and the sunshade 16, the CPUs 21 and 31 drive and control the panel drive motor 26 and the sunshade drive motor 36 respectively so that the movable panel 15 and the sunshade 16 perform the closing operation in conjunction with each other.

The CPUs 21 and 31 share information with each other via the communication circuits 27 and 37. Specifically, the CPU 21 at the panel control unit 20 receives various information indicating the rotation position As and the rotation speed Ns of the sunshade drive motor 36, from the CPU 31 at the sunshade control unit 30. On the other hand, the CPU 31 at the sunshade control unit 30 receives various information indicating the rotation position Ap and the rotation speed Np of the panel drive motor 26, from the CPU 21 at the panel control unit 20.

In the opening operation of the movable panel 15 and the sunshade 16, the CPU 21 drives and controls the panel drive motor 26 in a simple manner so that the movable panel 15 which should be positioned (i.e., which is configured to be positioned) behind the sunshade 16 in the opening direction maintains a predetermined distance from the sunshade 16 which should be positioned (i.e., which is configured to be positioned) ahead of the movable panel 15 in the opening direction. That is, in the opening operation, the movable panel 15 serves as a succeeding member while the sunshade 16 serves as a preceding member. On the other hand, in the closing operation of the movable panel 15 and the sunshade 16, the CPU 31 drives and controls the sunshade drive motor 36 in a simple manner so that the sunshade 16 which should be positioned behind the movable panel 15 in the closing direction maintains a predetermined distance from the movable panel 15 which should be positioned ahead of the sunshade 16 in the closing direction. That is, in the closing operation, the sunshade 16 serves as the succeeding member while the movable panel 15 serves as the preceding member. In the closing operation, the CPUs 21 and 31 control and drive the panel drive motor 26 and the sunshade drive motor 36 respectively so that the movable panel 15 is positioned ahead of the sunshade 16 in the closing direction. In addition, in the opening direction, the CPUs 21 and 31 control and drive the panel drive motor 26 and the sunshade drive motor 36 respectively so that the sunshade 16 is positioned ahead of the movable panel 15 in the opening direction.

Figure 2:
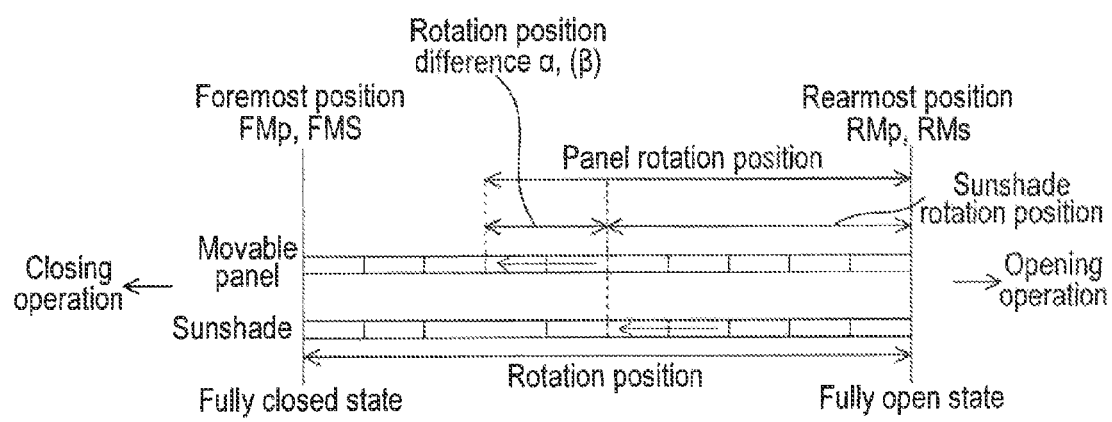
FIG. 2 is a diagram explaining a relation between rotation positions of a panel drive motor and a sunshade drive motor.

A relation between the rotation positions Ap and As of the panel drive motor 26 and the sunshade drive motor 36 will be explained as follows with reference to an explanatory diagram of FIG. 2. In FIG. 2, for convenience, the rotation range of the panel drive motor 26 from the fully closed state to the fully open state of the movable panel 15 (i.e., the range from the foremost rotation position FMp to the rearmost rotation position RMp) is coincide with the rotation range of the sunshade drive motor 36 from the fully closed state to the fully open state of the sunshade 16 (i.e., the range from the foremost rotation position FMs to the rearmost rotation position RMs). In this case, a rotation position difference $\Delta$ (=As−Ap≥0) between the rotation position As of the sunshade drive motor 36 and the rotation position Ap of the panel drive motor 26 one-to-one corresponds to a separation distance between the sunshade 16 and the movable panel 15 which is positioned ahead of the sunshade 16 in the closing direction or a separation distance between the movable panel 15 and the sunshade 16 which is positioned ahead of the movable panel 15 in the opening direction. A state where the rotation position difference $\Delta$ is a negative value indicates that the movable panel 15 is positioned ahead of the sunshade 16 in the opening direction or the sunshade 16 is positioned ahead of the movable panel 15 in the closing direction, i.e., a reversal position relation between the movable panel 15 and the sunshade 16 is established.

At the start of the opening operation of the movable panel 15, for example, the CPU 21 drives and controls the panel drive motor 26 so as not to start the opening operation of the movable panel 15 until the rotation position difference $\Delta$ becomes equal to or greater than a predetermined first rotation position difference $\alpha 1$ (≥0). That is, the panel control unit 20 according to the present embodiment includes a prohibition control device serving as a prohibition device. The CPU 21 prohibits the start of the opening operation of the movable panel 15 in a case where the separation distance between the movable panel 15 and the sunshade 16 which should be positioned ahead of the movable panel 15 in the opening direction is smaller than a predetermined distance, i.e., a distance corresponding to the first rotation position difference $\alpha 1$.

In a case where the rotation position difference $\Delta$ becomes smaller than a predetermined second rotation position difference $\alpha 2$ (≥0) after the start of the opening operation of the movable panel 15, the CPU 21 drives and controls the panel drive motor 26 to stop the opening operation of the movable panel 15. That is, the panel control unit 20 according to the present embodiment includes a control device. The CPU 21 stops the opening operation of the movable panel 15, i.e., the operation of the movable panel 15 is stopped at a first position, in a case where the separation distance between the movable panel 15 and the sunshade 16 which should be positioned ahead of the movable panel 15 in the opening direction is smaller than a predetermined distance, i.e., a distance corresponding to the second rotation position difference $\alpha 2$.

Accordingly, in the opening operation of the movable panel 15 and the sunshade 16, the separation distance between the movable panel 15 and the sunshade 16 which should be positioned ahead of the movable panel 15 in the opening direction is inhibited from being smaller than the predetermined distance.

Figure 6A:
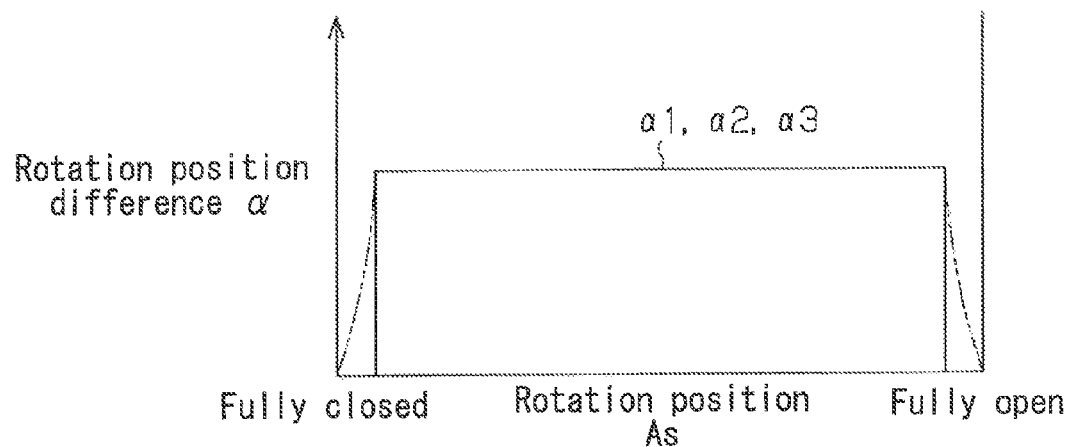
FIGS. 6A and 6B are maps illustrating a relation between a rotation position and a rotation position difference.

As illustrated in FIG. 6A, each of the first and second rotation position differences $\alpha 1$ and $\alpha 2$ turns to zero when the rotation position As of the sunshade drive motor 36 is arranged at or around the foremost rotation position FMs corresponding to the fully closed state of the sunshade 16, and at or around the rearmost rotation position RMs corresponding to the fully open state of the sunshade 16. In addition, each of the first and second rotation position differences $\alpha 1$ and $\alpha 2$ is specified to be a predetermined value (specifically, a positive value) between the foremost rotation position FMs and the rearmost rotation position RMs. That is, the panel control unit 20 according to the present embodiment includes a change device. Accordingly, in a case where the sunshade 16 starts opening from the fully closed state in association with the operation of the interlock operation switch 40 for opening, the movable panel 15 immediately starts opening in association with the opening operation of the sunshade 16. In addition, in a case where the sunshade 16 is brought to the fully open state or nearly to the fully open state, the movable panel 15 that is opening may be brought to the fully open state without being stopped.

On the other hand, at the start of the closing operation of the sunshade 16, for example, the CPU 31 drives and controls the sunshade drive motor 36 so as not to start the closing operation of the sunshade 16 until the rotation position difference $\Delta$ becomes equal to or greater than a predetermined fourth rotation position difference $\beta 1$ (≥0). That is, the sunshade control unit 30 according to the present embodiment includes the prohibition control device serving as the prohibition device. The CPU 31 prohibits the start of the closing operation of the sunshade 16 in a case where the separation distance between the sunshade 16 and the movable panel 15 which should be positioned ahead of the sunshade 16 in the closing direction is smaller than a predetermined distance, i.e., a distance corresponding to the fourth rotation position difference $\beta 1$.

In a case where the rotation position difference $\Delta$ becomes smaller than a predetermined fifth rotation position difference $\beta 2$ (≥0) after the start of the closing operation of the sunshade 16, the CPU 31 drives and controls the sunshade drive motor 36 to stop the closing operation of the sunshade 16. That is, the sunshade control unit 30 according to the present embodiment includes the control device. The CPU 31 stops the closing operation of the sunshade 16, i.e., the operation of the sunshade 16 is stopped at the first position, in a case where the separation distance between the sunshade 16 and the movable panel 15 which should be positioned ahead of the sunshade 16 in the closing direction is smaller than a predetermined distance, i.e., a distance corresponding to the fifth rotation position difference $\beta 2$.

Accordingly, in the closing operation of the movable panel 15 and the sunshade 16, the separation distance between the sunshade 16 and the movable panel 15 which should be positioned ahead of the sunshade 16 in the closing direction is inhibited from being smaller than the predetermined distance.

Figure 6B:
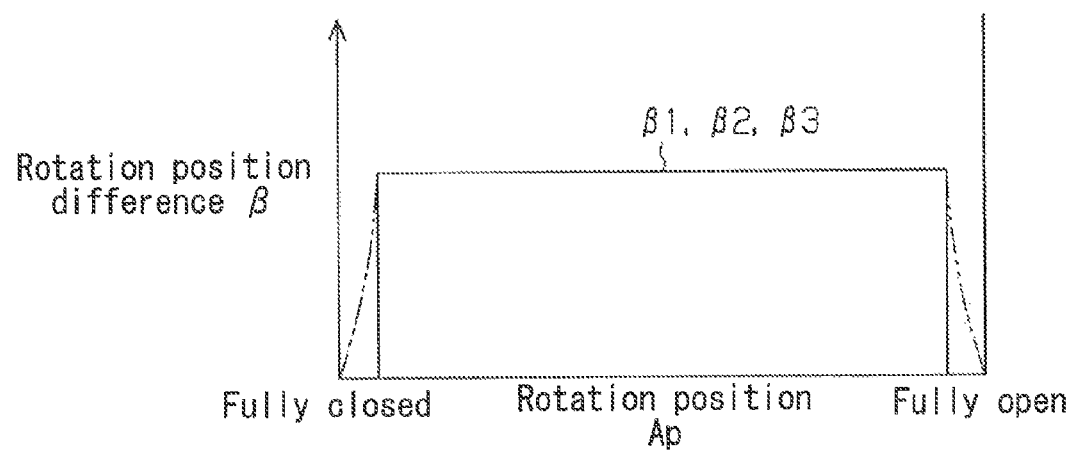
Figure 7:
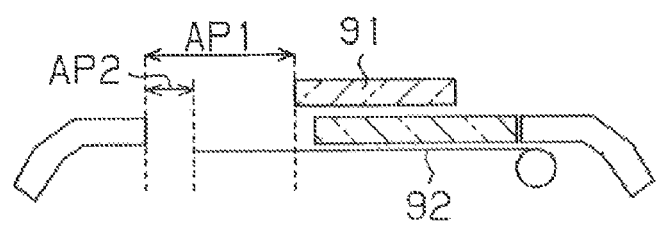
FIG. 7 is a side view schematically illustrating a configuration of a known sunroof apparatus.

As illustrated in Fig. 6B, each of the fourth and fifth rotation position differences $\beta 1$ and $\beta 2$ turns to zero when the rotation position Ap of the panel drive motor 26 is arranged at or around the foremost rotation position FMp corresponding to the fully closed state of the movable panel 15, and at or around the rearmost rotation position RMp corresponding to the fully open state of the movable panel 15. In addition, each of the fourth and fifth rotation position differences $\beta 1$ and $\beta 2$ is specified to be a predetermined value (specifically, a positive value) between the foremost rotation position FMp and the rearmost rotation position RMp. That is, the sunshade control unit 30 according to the present embodiment includes the change device. Accordingly, in a case where the movable panel 15 starts closing from the fully open state in association with the operation of the interlock operation switch 40 for closing, the sunshade 16 immediately starts closing in association with the closing operation of the movable panel 15. In addition, in a case where the movable panel 15 is brought to the fully closed state or nearly to the fully closed state, the sunshade 16 that is closing may be brought to the fully closed state without being stopped.

Next, an example of control to open and close the movable panel 15 and the sunshade 16 by the CPUs 21 and 31, i.e., of control to drive the panel drive motor 26 and the sunshade drive motor 36, will be explained.

First, a control to open the movable panel 15 by the CPU 21 will be explained. The opening operation of the movable panel 15 is started when a signal indicating the operation of the interlock operation switch 40 or the panel operation switch 29 for opening the movable panel 15 is input to the CPU 21. The signal indicating the operation of the interlock operation switch 40 for opening the movable panel 15 is also input to the CPU 31. Therefore, in this case, the CPU 31 drives and controls the sunshade drive motor 36 to open the sunshade 16. The sunshade drive motor 36 may be driven by the CPU 31 by a PWM control or at a maximum output, i.e., 100% duty ratio. The driving of the sunshade drive motor 36 by the CPU 31 is conducted until the rotation position As of the sunshade drive motor 36 reaches an electric stop position serving as a predetermined stop position specified beforehand, or until the operation of the interlock operation switch 40 for opening the movable panel 15 is stopped. That is, the sunshade control unit 30 of the present embodiment includes a forced control device serving as a forced device. The electric stop position is the rotation position As corresponding to the fully closed position or the fully open position, for example, of the sunshade 16. Specifically, the electric stop position is a position at which the operation of the sunshade 16 should be once stopped, for example, a specific position at which an operation mode of the sunshade 16 is changed.

Figure 4:
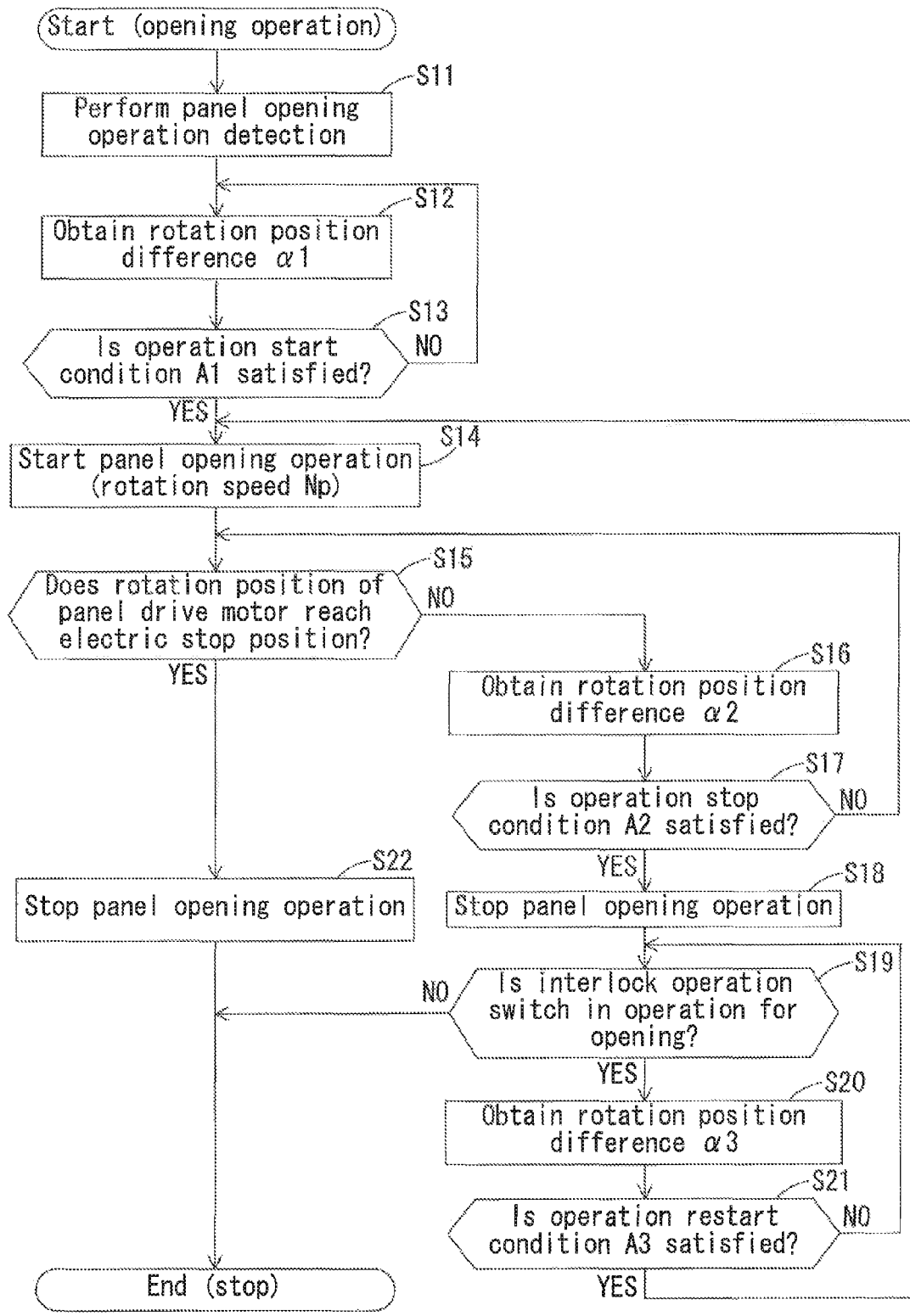
FIG. 4 is a flowchart illustrating a control during an opening operation according to the embodiment.

In a case where a routine as illustrated in FIG. 4 is initiated, the CPU 21 at the panel control unit 20 obtains various data for detecting a panel opening operation (i.e., a panel opening detection) in Step 11 (i.e., S11, hereinafter "Step" will be abbreviated to "S"). In S12, the CPU 21 obtains the first rotation position difference α1. That is, the CPU 21 calculates the rotation position difference Δ (=As−Ap) based on the present rotation position Ap of the panel drive motor 26 and the present rotation position As of the sunshade drive motor 36, and reads the first rotation position difference α1 conforming to the present rotation position As from a map illustrated in FIG. 6A.

Next, the CPU 21 determines whether or not an operation start condition A1 is satisfied in S13. The operation start condition A1 is satisfied in a state where the present rotation position difference Δ is equal to or greater than the first rotation position difference α1, i.e., the movable panel 15 is away from the sunshade 16 which should be positioned ahead of the movable panel 15 in the opening direction by the predetermined distance (i.e., the distance corresponding to the first rotation position difference α1) or more.

In a case where it is determined that the operation start condition A1 is not satisfied in S13, the distance between the movable panel 15 and the sunshade 16 which should be positioned ahead of the movable panel 15 in the opening direction is smaller than the predetermined distance. Thus, the CPU 21 returns to S12 to repeat the process in S12. On the other hand, in a case where it is determined that the operation start condition A1 is satisfied S13, the distance between the movable panel 15 and the sunshade 16 which should be positioned ahead of the movable panel 15 in the opening direction is equal to or greater than the predetermined distance. Thus, the CPU 21 proceeds to S14 to start driving the panel drive motor 26 so that the opening operation of the movable panel 15 is started. That is, the start of the opening operation of the movable panel 15 is prohibited until the movable panel 15 is separated by the predetermined distance or more from the sunshade 16 which should be positioned ahead of the movable panel 15 in the opening direction. The panel drive motor 26 may be driven, i.e., the rotation speed Np may be controlled, by the CPU 21 by a PWM control or at a maximum output, i.e., 100% duty ratio.

The CPU 21 then proceeds to S15 to determine whether or not the present rotation position Ap of the panel drive motor 26 reaches an electric stop position serving as the predetermined stop position. The electric stop position is the rotation position Ap corresponding to the fully closed position, the fully open position, or the tilt-up position of the movable panel 15. Specifically, the electric stop position is a position at which the operation of the movable panel 15 should be once stopped, for example, a specific position at which an operation mode of the movable panel 15 is changed.

In a case where it is determined that the rotation position Ap reaches the electric stop position, the CPU 21 proceeds to S22 to stop driving the panel drive motor 26 so as to stop the opening operation of the movable panel 15, i.e., the operation of the movable panel 15 is stopped at a second position. The panel control unit 20 of the present embodiment includes a priority control device serving as a device. The CPU 21 terminates the present routine accordingly. On the other hand, in a case where it is determines that the rotation position Ap does not reach the electric stop position in S15, the CPU 21 proceeds to S16 to obtain the second rotation position difference α2. That is, the CPU 21 calculates the rotation position difference Δ (=As−Ap) based on the present rotation position Ap of the panel drive motor 26 and the present rotation position As of the sunshade drive motor 36 and reads the second rotation position difference α2 conforming to the present rotation position As from the map illustrated in FIG. 6A.

Next, the CPU 21 determines whether or not an operation stop condition A2 is satisfied in S17. The operation stop condition A2 is satisfied in a state where the present rotation position difference Δ is smaller than the second rotation position difference α2, i.e., the distance between the movable panel 15 and the sunshade 16 which should be positioned ahead of the movable panel 15 in the opening direction is smaller than the predetermined distance (i.e., the distance corresponding to the second rotation position difference α2).

In a case where it is determined that the operation stop condition A2 is not satisfied in S17, the distance between the movable panel 15 and the sunshade 16 which should be positioned ahead of the movable panel 15 in the opening direction is equal to or greater than the predetermined distance. Thus, the CPU 21 returns to S15 to repeat the process from S15. On the other hand, in a case where it is determined that the operation stop condition A2 is satisfied in S17, the distance between the movable panel 15 and the sunshade 16 which should be positioned ahead of the movable panel 15 in the opening direction is smaller than the predetermined distance. Thus, the CPU 21 proceeds to S18 to stop driving the panel drive motor 26 so that the opening operation of the movable panel 15 is stopped.

That is, in a case where the distance between the movable panel 15 and the sunshade 16 which should be positioned ahead of the movable panel 15 in the opening direction is equal to or greater than the predetermined distance, the opening operation of the movable panel 15 is continued unless the movable panel 15 reaches the electric stop position that is specified beforehand. In a case where the movable panel 15 reaches the electric stop position or the distance between the movable panel 15 and the sunshade 16 which should be positioned ahead of the movable panel 15 in the opening direction becomes smaller than the predetermined distance, the opening operation of the movable panel 15 is stopped.

The CPU21, which stops the driving of the panel drive motor 26 in S18, proceeds to S19 to determine whether or not the interlock operation switch 40 is currently operated (in operation) for opening the movable panel 15 and the sunshade 16. Then, when it is determined that the interlock operation switch 40 is not currently operated for opening the movable panel 15 and the sunshade 16, i,e., the panel operation switch 29 is currently operated for opening the movable panel 15 or the operation of the interlock operation switch 40 for opening the movable panel 15 and the sunshade 16 is stopped, the CPU 21 terminates the present routine.

In a case where it is determined that the interlock operation switch 40 is currently operated for opening the movable panel 15 and the sunshade 16 in S19, the CPU 21 proceeds to S20 to obtain a predetermined third rotation position difference $\alpha 3$. The transition of the third rotation position difference $\alpha 3$ is specified beforehand in the same way as the first and second rotation position differences $\alpha 1$ and $\alpha 2$ as illustrate in FIG. 6A. Accordingly, the CPU 21 calculates the rotation position difference $\Delta$ (=As−Ap) based on the present rotation position Ap of the panel drive motor 26 and the present rotation position As of the sunshade drive motor 36 and reads the third rotation position difference $\alpha 3$ conforming to the rotation position As from the map illustrated in FIG. 6A.

Next, the CPU 21 determines whether or not an operation restart condition A3 is satisfied in S21. The operation restart condition A3 is satisfied in a state where the present rotation position difference $\Delta$ is equal to or greater than the third rotation position difference $\alpha 3$, i.e., the movable panel 15 is separated, by a predetermined distance, 1,e., a distance corresponding to the third rotation position difference $\alpha 3$, from the sunshade 16 which should be positioned ahead of the movable panel 15 in the opening direction.

In a case where it is determined that the operation restart condition A3 is not satisfied in S21, the distance between the movable panel 15 and the sunshade 16 which should be positioned ahead of the movable panel 15 in the opening direction is smaller than the predetermined distance. Thus, the CPU 21 returns to S19 to repeat the process from S19. On the other hand, in a case where it is determined that the operation restart condition A3 is satisfied in S21, the distance between the movable panel 15 and the sunshade 16 which should be positioned ahead of the movable panel 15 in the opening direction is equal to or greater than the predetermined distance. Thus, the CPU 21 returns to S14 to start (specifically, to restart) driving the panel drive motor 26 so that the opening operation of the movable panel 15 is started. That is, the start (restart) of the opening operation of the movable panel 15 is prohibited until the movable panel 15 is separated by the predetermined distance or more from the sunshade 16 which should be positioned ahead of the movable panel 15 in the opening direction.

A control to close the sunshade 16 by the CPU 31 will be explained. The closing operation of the sunshade 16 is started when a signal indicating the operation of the shade operation switch 39 or the interlock operation switch 40 for closing the sunshade 16 is input to the CPU 31. The signal indicating the operation of the interlock operation switch 40 for closing the sunshade 16 is also input to the CPU 21. Therefore, in this case, the CPU 21 drives and controls the panel drive motor 26 so as to close the movable panel 15. The panel drive motor 26 may be driven by the CPU 21 by a PWM control or at a maximum output, i.e., 100% duty ratio. The driving of the panel drive motor 26 by the CPU 21 is continued until the rotation position Ap of the panel drive motor 26 reaches the electric stop position, i.e., the rotation position Ap corresponding to a position at which the operation of the movable panel 15 should be once stopped, or until the operation of the interlock operation switch 40 for closing the sunshade 16 is stopped. That is, the panel control unit 20 of the present embodiment includes the forced control device serving as the forced device.

Figure 5:
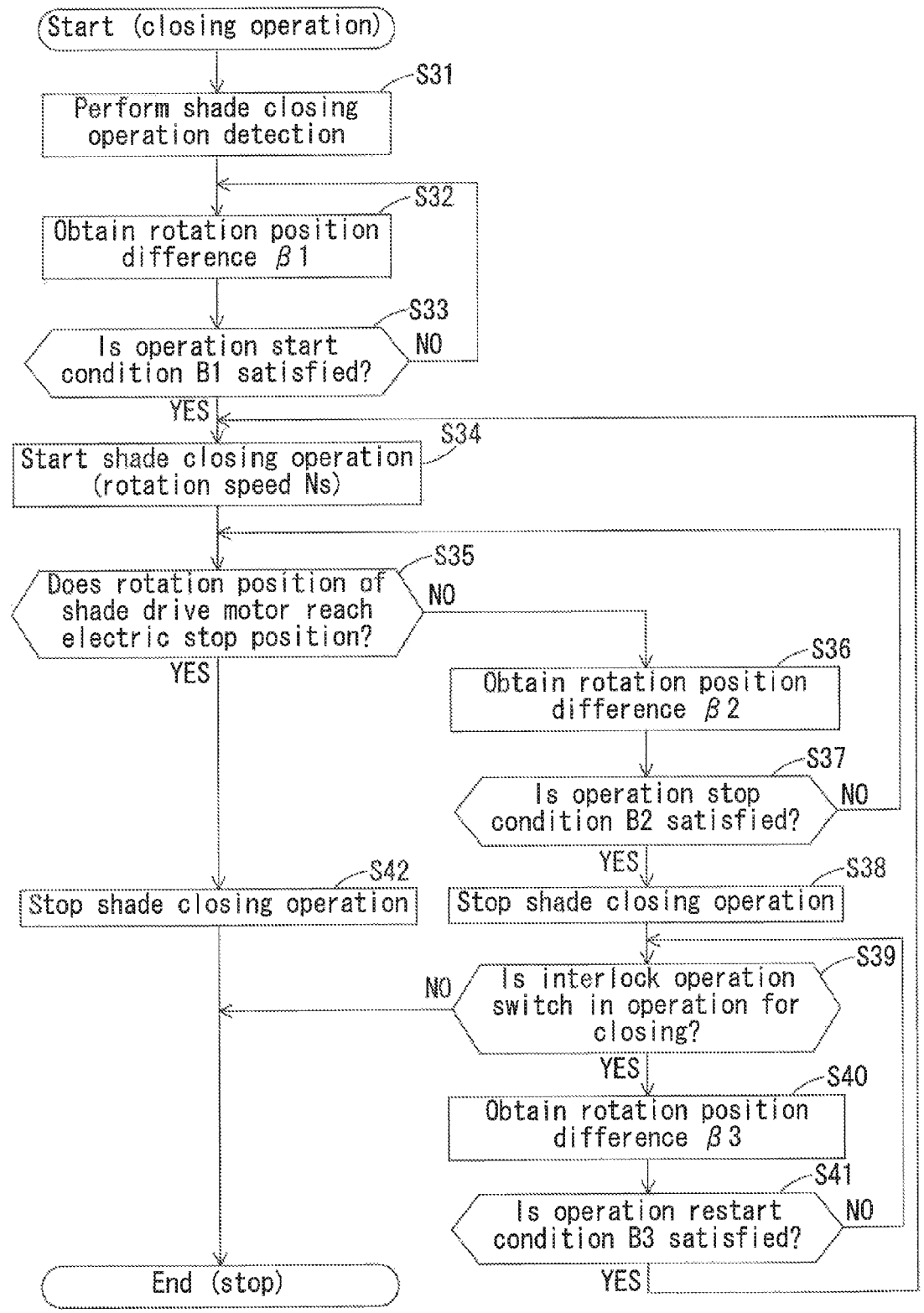
FIG. 5 is a flowchart illustrating a control during a closing operation according to the embodiment.

In a case where a routine as illustrated in FIG. 5 is initiated, the CPU 31 at the sunshade control unit 30 obtains various data for detecting a shade closing operation (i.e., a shade closing detection) in S31. In S32, the CPU 31 obtains the fourth rotation position difference $\beta 1$. That is, the CPU 31 calculates the rotation position difference $\Delta$ (=As−Ap) based on the present rotation position Ap of the panel drive motor 26 and the present rotation position As of the sunshade drive motor 36, and reads the fourth rotation position difference $\beta 1$ conforming to the present rotation position Ap from a map illustrated in FIG. 6B.

Next, the CPU 31 determines whether or not an operation start condition B1 is satisfied in S33. The operation start condition B1 is satisfied in a state where the present rotation position difference $\Delta$ is equal to or greater than the fourth rotation position difference $\beta 1$, i.e., the sunshade 16 is away from the movable panel 15 which should be positioned ahead of the sunshade 16 in the closing direction by the predetermined distance, i.e., the distance corresponding to the fourth rotation position deference $\beta 1$, or more.

In a case where it is determined that the operation start condition B1 is not satisfied in S33, the distance between the sunshade 16 and the movable panel 15 which should be positioned ahead of the sunshade 16 in the closing direction is smaller than the predetermined distance. Thus, the CPU 31 returns to S32 to repeat the process in S32. On the other hand, in a case where it is determined that the operation start condition B1 is satisfied in S33, the distance between the sunshade 16 and the movable panel 15 which should be positioned ahead of the sunshade 16 in the closing direction is equal to or greater than the predetermined distance Thus, the CPU 31 proceeds to S34 to start driving the sunshade drive motor 36 so that the closing operation of the sunshade 16 is started. That is, the start of the closing operation of the sunshade 16 is prohibited until the sunshade 16 is separated by the predetermined distance or more from the movable panel 15 which should be positioned ahead of the sunshade 16 in the closing direction. The sunshade drive motor 36 may be driven, i.e., the rotation speed No may be controlled, by the CPU 31 by a PWM control or at a maximum output, i.e., 100% duty ratio.

The CPU 31 then proceeds to S35 to determine whether or not the present rotation position As of the sunshade drive motor 36 reaches the electric stop position, i.e., the rotation position As corresponding to the position at which the sunshade 16 should be once stopped.

In a case where it is determined that the rotation position As reaches the electric stop position, the CPU 31 proceeds to S42 to stop driving the sunshade drive motor 36 so as to stop the closing operation of the sunshade 16, i.e., the operation of the sunshade 16 is stopped at the second position. The sunshade control unit 30 of the present embodiment includes the priority control device serving as the device. The CPU 31 terminates the present routine accordingly. On the other hand, in a case where it is determines that the rotation position As does not reach the electric stop position in S35, the CPU 31 proceeds to S36 to obtain the fifth rotation position difference β2. That is, the CPU 31 calculates the rotation position difference Δ (=As−Ap) based on the present rotation position Ap of the panel drive motor 26 and the present rotation position As of the sunshade drive motor 36 and reads the fifth rotation position difference β2 conforming to the present rotation position Ap from the map illustrated in FIG. 6B.

Next, the CPU 31 determines whether or not an operation stop condition B2 is satisfied in S37. The operation stop condition B2 is satisfied in a state where the present rotation position difference Δ is smaller than the fifth rotation position difference β2, i.e., the distance between the sunshade 16 and the movable panel 15 which should be positioned ahead of the sunshade 16 in the closing direction is smaller than the predetermined distance, i.e., the distance corresponding to the fifth rotation position deference β2.

In a case where it is determined that the operation stop condition B2 is not satisfied in S37, the distance between the sunshade 16 and the movable panel 15 which should be positioned ahead of the sunshade 16 in the closing direction is equal to or greater than the predetermined distance. Thus, the CPU 31 returns to S35 to repeat the process from S35. On the other hand, in a case where it is determined that the operation stop condition B2 is satisfied in S37, the distance between the sunshade 16 and the movable panel 15 which should be positioned ahead of the sunshade 16 in the closing direction is smaller than the predetermined distance. Thus, the CPU 31 proceeds to S38 to stop driving the sunshade drive motor 36 so that the closing operation of the sunshade 16 is stopped.

That is, in a case where the distance between the sunshade 16 and the movable panel 15 which should be positioned ahead of the sunshade 16 in the closing direction is equal to or greater than the predetermined distance, the closing operation of the sunshade 16 is continued unless the sunshade 16 reaches the electric stop position that is specified beforehand. In a case where the sunshade 16 reaches the electric stop position or the distance between the sunshade 16 and the movable panel 15 which should be positioned ahead of the sunshade 16 in the closing direction becomes smaller than the predetermined distance, the closing operation of the sunshade 16 is stopped.

The CPU 31, which stops the driving of the sunshade drive motor 36 in S38, proceeds to S39 to determine whether or not the interlock operation switch 40 is currently operated (in operation) for closing the movable panel 15 and the sunshade 16. Then, when it is determined that the interlock operation switch 40 is not currently operated for closing the movable panel 15 and the sunshade 16, i.e., the shade operation switch 39 is currently operated for closing the sunshade 16 or the interlock operation switch 40 for closing the movable panel 15 and the sunshade 16 is stopped, the CPU 31 terminates the present routine.

In a case where it is determined that the interlock operation switch 40 is currently operated for closing the movable panel 15 and the sunshade 16 in S39, the CPU 31 proceeds to S40 to obtain a predetermined sixth rotation position difference β3. The transition of the sixth rotation position difference β3 is specified beforehand in the same way as the fourth and fifth rotation position differences β1 and β2 as illustrate in FIG. 6B. Accordingly, the CPU 31 calculates the rotation position difference Δ based on the present rotation position Ap of the panel drive motor 26 and the present rotation position As of the sunshade drive motor 36 and reads the sixth rotation position difference β3 conforming to the present rotation position Ap from the map illustrated in FIG. 6B.

Next, the CPU 31 determines whether or not an operation restart condition B3 is satisfied in S41. The operation restart condition B3 is satisfied in a state where the present rotation position difference Δ is equal to or greater than the sixth rotation position difference β3, i.e., the sunshade 16 is separated by a predetermined distance, i.e., a distance corresponding to the sixth rotation position difference β3, from the movable panel 15.

In a case where it is determined that the operation restart condition B3 is not satisfied in S41, the distance between the sunshade 16 and the movable panel 15 which should be positioned ahead of the sunshade 16 in the closing direction is smaller than the predetermined distance. Thus, the CPU 31 returns to S39 to repeat the process from S39. On the other hand, in a case where it is determined that the operation restart condition B3 is satisfied, the distance between the sunshade 16 and the movable panel 15 which should be positioned ahead of the sunshade 16 in the closing direction is equal to or greater than the predetermined distance. Thus, the CPU 31 returns to S34 to start (specifically, to restart) driving the sunshade drive motor 36 so that the closing operation of the sunshade 16 is started. That is, the start (restart) of the closing operation of the sunshade 16 is prohibited until the sunshade 16 is separated by the predetermined distance or more from the movable panel 15 which should be positioned ahead of the sunshade 16 in the closing direction.

An operation of the control apparatus according to the embodiment will be explained next. First, in a case where the panel operation switch 29 or the interlock operation switch 40 is operated for opening the movable panel 15 and/or the sunshade 16 in a state where the distance between the movable panel 15 and the sunshade 16 which should be positioned ahead of the movable panel 15 in the opening direction becomes smaller than the predetermined distance, the start of the opening operation of the movable panel 15 is prohibited. In addition, the opening operation of the movable panel 15 is stopped when the distance between the movable panel 15 and the sunshade 16 which should be positioned ahead of the movable panel 15 in the opening direction becomes smaller than the predetermined distance. Specifically, during the interlock operation of the movable panel 15 and the sunshade 16 by the operation of the interlock operation switch 40 for opening the movable panel 15 and the sunshade 16, the start (restart) of the opening operation of the movable panel 15 is prohibited until the movable panel 15 that is stopped is separated from the sunshade 16 that is opening by the predetermined distance or more.

According to the present embodiment, the distance between the movable panel 15 and the sunshade 16 which should be positioned ahead of the movable panel 15 in the opening direction is inhibited from decreasing below the predetermined distance. Thus, the possibility of establishment of the reversal position relation between the movable panel 15 and the sunshade 16 may be reduced. In addition, in a case where the sunshade 16 is arranged in the fully open state or in the vicinity thereof, the rotation position difference α1, α2, α3 is specified to be zero and therefore the opening operation of the movable panel 15 may be continuously performed until the movable panel 15 is brought to the fully open state. Further, regardless of the separation distance between the movable panel 15 and the sunshade 16, the opening operation of the movable panel 15 may be stopped when the movable panel 15 reaches the electric stop position.

On the other hand, in a case where the shade operation switch 39 or the interlock operation switch 40 is operated for closing the sunshade 16 and/or the movable panel 15 in a state where the distance between the sunshade 16 and the movable panel 15 which should be positioned ahead of the sunshade 16 in the closing direction becomes smaller than the predetermined distance, the start of the closing operation of the sunshade 16 is prohibited. In addition, the closing operation of the sunshade 16 is stopped when the distance between the sunshade 16 and the movable panel 15 which should be positioned ahead of the sunshade 16 in the closing direction becomes smaller than the predetermined distance. Specifically, during the interlock operation of the movable panel 15 and the sunshade 16 by the operation of the interlock operation switch 40 for closing the movable panel 15 and the sunshade 16, the start (restart) of the closing operation of the sunshade 16 is prohibited until the sunshade 16 that is stopped is separated from the movable panel 15 that is closing by the predetermined distance or more.

According to the present embodiment, the distance between the sunshade 16 and the movable panel 15 which should be positioned ahead of the sunshade 16 in the closing direction is inhibited from decreasing below the predetermined distance. Thus, the possibility of establishment of the reversal position relation between the movable panel 15 and the sunshade 16 may be reduced. In addition, in a case where the movable panel 15 is arranged in the fully closed state or in the vicinity thereof, the rotation position difference $\beta 1$, $\beta 2$, $\beta 3$ is specified to be zero and therefore the closing operation of the sunshade 16 may be continuously performed until the sunshade 16 is brought to the fully closed state. Further, regardless of the separation distance between the movable panel 15 and the sunshade 16, the closing operation of the sunshade 16 may be stopped when the sunshade 16 reaches the electric stop position.

According to the aforementioned embodiment, the distance between the movable panel 15 and the sunshade 16 which should be positioned ahead of the movable panel 15 in the opening direction or the distance between the sunshade 16 and the movable panel 15 which should be positioned ahead of the sunshade 16 in the closing direction is basically inhibited from decreasing below the predetermined distance. That is, the succeeding member is basically consistently separated from the preceding member by the predetermined distance. In addition, even when the succeeding member is positioned close to the preceding member so that the distance therebetween is smaller than the predetermined distance, the succeeding member is inhibited from further getting closer to the preceding member. Accordingly, the possibility of establishment of the reversal position relation between the preceding member and the succeeding member in each of the opening direction and the closing direction may be reduced.

In addition, according to the aforementioned embodiment, the separation distance (the rotation position difference $\alpha 1$, $\alpha 2$, $\alpha 3$, $\beta 1$, $\beta 2$, $\beta 3$) between the succeeding member and the preceding member varies depending on the position of the preceding member in the opening direction or the closing direction (i.e., relative to the opening position or the closing position). Specifically, in a case where the preceding member is arranged at the position at which the reversal position relation is unlikely to be established, for example, the preceding member is arranged at or around the position corresponding to the fully open state thereof, the separation distance is changed or specified to be zero so as to avoid the succeeding member to be stopped unnecessarily apart from the preceding member. Then, the opening operation or the closing operation of the succeeding member is continued in a state where the preceding member is in the fully open state or the fully closed state, thereby bringing the succeeding member to the fully open state or the fully closed state.

Further, according to the aforementioned embodiment, in a case where the succeeding member reaches the predetermined electric stop position before the distance between the succeeding member and the preceding member decreases to be the predetermined distance, the opening operation or the closing operation of the succeeding member may be stopped at the electric stop position.

Furthermore, according to the aforementioned embodiment, in a case where the succeeding member is stopped at a position where the distance from the preceding member is smaller than the predetermined distance, the succeeding member is controlled so that the succeeding member is inhibited from unnecessarily starting the opening operation or the closing operation. Accordingly, compared to a case where the succeeding member is immediately stopped after once starting the opening operation or the closing operation, the possibility of establishment of the reversal relation may be reduced.

Furthermore, because the possibility of establishment of the reversal position relation may be reduced when the opening operation or the closing operation of the succeeding member is stopped, the possibility that the start of the next opening operation or closing operation of the succeeding member is prohibited (i.e., the possibility that the operation start condition A1 or B1 is not established) is reduced. Then, possibility of giving an uncomfortable feeling to a user because the opening operation or the closing operation of the succeeding member does not start even though the operation switch 29, 39, or 40 is operated for opening or closing the succeeding member may be reduced. Alternatively, at a time when the preceding member and the succeeding member are operated in conjunction with each other, possibility of giving an uncomfortable feeling to a user because the opening operation or the closing operation of the succeeding member only is inhibited from starting may be reduced.

Furthermore, according to the aforementioned embodiment, the movable panel 15 is restrained from being brought to the fully open state before the sunshade 16 is brought to the fully open state. Thus, in a state where the movable panel 15 is in the fully open state, the sunshade 16 is also basically brought to the fully open state. For example, the sunshade 16 is inhibited from flapping by receiving wind to generate abnormal sound.

The sunshade 16 is restrained from being brought to the fully closed state before the movable panel 15 is brought to the fully closed state. Thus, even in a case where the shifting of the movable panel 15 to the fully closed state is not completed, the sunshade 16 is inhibited from being brought to the fully closed state and therefore the condition of the movable panel 15 is visually confirmed from an interior side of the vehicle 100. The movable panel 15 is restrained from being maintained in a state not completely closed. Further, a damage of the sunshade 16, for example, caused by rain or dirt may be restrained.

According to the aforementioned embodiment, a relatively simple configuration change for adding the communication circuits 27 and 37 to an existing configuration for opening and closing the movable panel 15 and an existing configuration for opening and closing the sunshade 16, and for linking the panel control unit 20 and the sunshade control unit 30 to each other may reduce the possibility of establishment of the reversal position relation between the movable panel 15 and the sunshade 16.

Further, according to the aforementioned embodiment, in a case of opening the movable panel 15, variations in motor characteristics, variations in mechanical configurations, a difference between slide resistances of the operations, or a difference of motor temperature characteristics, for example, are not necessary to consider for the drive control of the panel drive motor 26. The panel control unit 20 monitors the rotation position As of the sunshade drive motor 36 to thereby reduce the possibility of establishment of the reversal position relation. In the same manner, in a case of closing the sunshade 16, variations in motor characteristics, variations in mechanical configurations, a difference between slide resistances of the operations, or a difference of motor temperature characteristics, for example, are not necessary to consider for the drive control of the sunshade drive motor 36. The sunshade control unit 30 monitors the rotation position Ap of the panel drive motor 26 to thereby reduce the possibility of establishment of the reversal position relation.

According to the present embodiment, the CPU 21 waits the start of driving the panel drive motor 26 until the operation start condition A1 is satisfied (i.e., YES in S13). Thus, a calculation load of the CPU 21 at this time may be reduced.

In the same way, the sunshade drive motor 36 waits the start of driving the sunshade drive motor 36 until the operation start condition B1 is satisfied (i.e., YES in S33). Thus, a calculation load of the CPU 31 at this time may be reduced.

According to the present embodiment, the CPU 21 waits the start of driving the panel drive motor 26 until the operation restart condition A3 is satisfied (i.e., YES in S21) while the movable panel 15 and the sunshade 16 are operated in conjunction with each other. Thus, a calculation load of the CPU 21 at this time may be reduced.

In the same way, the sunshade drive motor 36 waits the start of driving the sunshade drive motor 36 until the operation restart condition B3 is satisfied (i.e., YES in S41) while the movable panel 15 and the sunshade 16 are operated in conjunction with each other. Thus, a calculation load of the CPU 31 at this time may be reduced.

According to the aforementioned embodiment, while the movable panel 15 is in the tilt-up state, the sunshade 16 is still opened. Thus, during the driving of the vehicle, the generation of abnormal noise by the sunshade 16 receiving wind to flap may be restrained.

The aforementioned embodiment may be modified as below. The transition of each of the rotation position differences $\alpha 1$, $\alpha 2$, and $\alpha 3$ depending on the rotation position As of the sunshade drive motor 36 (the opened/closed position of the sunshade 16) is an example. As illustrated in chain double-dashed lines in FIG. 6A, for example, each of the rotation position differences $\alpha 1$, $\alpha 2$, and $\alpha 3$ may gradually decrease to be zero in the vicinity of the foremost rotation position FMs at which the sunshade 16 is in the fully closed state and gradually decrease to be zero in the vicinity of the rearmost rotation position RMs at which the sunshade 16 is in the fully open state.

The transitions of two or more of the rotation position differences $\alpha 1$, $\alpha 2$, and $\alpha 3$ depending on the rotation position As of the sunshade drive motor 36 (the opened/closed position of the sunshade 16) may be different from one another.

The transition of each of the rotation position differences $\beta 1$, $\beta 2$, and $\beta 3$ depending on the rotation position Ap of the panel drive motor 26 (the opened/closed position of the movable panel 15) is an example. As illustrated in chain double-dashed lines in FIG. 6B, for example, each of the rotation position differences $\beta 1$, $\beta 2$, and $\beta 3$ may gradually decrease to be zero in the vicinity of the foremost rotation position FMp at which the movable panel 15 is in the fully closed state and gradually decrease to be zero in the vicinity of the rearmost rotation position RMp at which the movable panel 15 is in the fully open state.

The transitions of two or more of the rotation position differences $\beta 1$, $\beta 2$, and $\beta 3$ depending on the rotation position Ap of the panel drive motor 26 (the opened/closed position of the movable panel 15) may be different from one another.

According to the aforementioned embodiment, the panel control unit 20 and the sunshade control unit 30 may be integrated to a single control unit. In this case, the communication circuits 27 and 37 are omitted while a CPU in which the functions of the CPUs 21 and 31 are integrated is applied. Then, all the drive circuits 22, 32, the input circuits 23 to 25, 33 to 35 are connected to the aforementioned CPU so as to integrally control the driving of the panel drive motor 26 and the sunshade drive motor 36.

According to the aforementioned embodiment, the panel control unit 20 and the sunshade control unit 30 are electrically connected to each other via the communication circuits 27 and 37. Alternatively, the communication circuits 27 and 37 may be separately controlled by a dominant or higher control unit, for example, a body ECU.

According to the aforementioned embodiment, the determination of the operation start condition A1 (S13) for the opening operation may be omitted. In this case, even when the opening operation of the movable panel 15 is once started in a state where the distance between the movable panel 15 and the sunshade 16 is smaller than the predetermined distance, the opening operation of the movable panel 15 is immediately stopped by the determination of the operation stop condition A2 (S17). The possibility of establishment of the reversal position relation may be substantially reduced.

According to the aforementioned embodiment, the panel drive motor 26 is controlled to stop on the condition that the panel operation switch 29 is continuously operated for opening the movable panel 15. Accordingly, the panel drive motor 26 may be stopped at ay timing at which the operation of the panel operation switch 29 for opening the movable panel 15 is stopped.

According to the aforementioned embodiment, the sunshade drive motor 36 is controlled to stop on the condition that the shade operation switch 39 is continuously operated for closing the sunshade 16. Accordingly, the sunshade drive motor 36 may be stopped at ay timing at which the operation of the shade operation switch 39 for closing the sunshade 16 is stopped.

According to the aforementioned embodiment, regardless of the independent operation of the movable panel 15 or the sunshade 16, or the interlock operation of the movable panel 15 and the sunshade 16, the succeeding member is controlled to stop, for example, so that the distance between the succeeding member and the preceding member is inhibited from being smaller than the predetermined distance. Alternatively, only at a time of the independent operation, the succeeding member may be controlled to stop, for example, so that the distance between the succeeding member and the preceding member is inhibited from being smaller than the predetermined distance. In this case, a delay process may be applied to the operation start timing of the succeeding member, for example, so that the succeeding member is inhibited from overtaking the preceding member at the start of the interlock operation. At this time, as long as the succeeding member is stopped after the independent operation thereof, the succeeding member is positioned away from the preceding member by the predetermined distance or more, thereby reducing time of the delay process for the subsequent interlock operation. Then, possibility to give an uncomfortable feeling to a user that the opening or closing operation of only the succeeding member is not started at the interlock operation of the preceding member and the succeeding member may be reduced.

According to the aforementioned embodiment, for the sake of convenience, the rotation range of the panel drive motor 26 from the fully closed state to the fully open state of the movable panel 15 (i.e., the range from the foremost rotation position FMp to the rearmost rotation position RMp) and the rotation range of the sunshade drive motor 36 from the fully closed state to the fully open state of the sunshade 16 (i.e., the range from the foremost rotation position FMs to the rearmost rotation position RMs) are the same. Alternatively, the aforementioned rotation ranges may be different from each other. For example, the rotation range of the sunshade drive motor 36 may be greater than the rotation range of the panel drive motor 26. In this case, the rotation range of the sunshade drive motor 36 may be reduced so as to be apparently equalized with the rotation range of the panel drive motor 26. Then, the panel drive motor 26 and the sunshade drive motor 36 are driven and controlled so that the relation in FIG. 2 is established in consideration of the aforementioned reduction of the rotation range of the sunshade drive motor 36. Alternatively, even in a case where the rotation range of the sunshade drive motor 36 from the foremost rotation position FMs to the rearmost rotation position RMs is greater than the rotation range of the panel drive motor 26 from the foremost rotation position FMp to the rearmost rotation position RMp, the panel drive motor 26 and the sunshade drive motor 36 are driven and controlled so that the relation in FIG. 2 is established.

According to the aforementioned embodiment, the drive motors 26 and 36 are driven and controlled by the PWM control. Alternatively, as long as the polarity is switchable in accordance with the rotation direction of each of the drive motors 26 and 36, the drive motors 26 and 36 may be driven and controlled by an on-off (energized and de-energized) switching control. In this case, the calculation load of the CPUs 21 and 31 related to the driving of the drive motors 26 and 36 may be reduced.

According to the aforementioned embodiment, the opened/closed position (state) of the movable panel 15 is detected by the detection of the rotation position Ap of the panel drive motor 26 by the pulse sensor 28. Alternatively, the opened/closed position of the movable panel 15 may be detected by an appropriate sensor (including a switch) that monitors the opened/closed position of the movable panel 15 from the fully closed state to the fully open state by one-to-one correspondence.

According to the aforementioned embodiment, the electrical stop position of the movable panel 15 and the electrical stop position of the sunshade 16 are separately defined. Alternatively, the electrical stop position of either the movable panel 15 or the sunshade 16 may be defined. One of the movable panel 15 and the sunshade 16 that stops at the electric stop position may be used for defining the electric stop position of the other of the movable panel 15 and the sunshade 16.

According to the aforementioned embodiment, the opened/closed position (state) of the movable panel 15 is detected by the detection of the rotation position Ap of the panel drive motor 26 by the pulse sensor 28. Alternatively, in a case where only a sensor for detecting the opening/closing speed of the movable panel 15 or the rotation speed of the panel drive motor 26 is provided, the opened/closed position of the movable panel 15 may be detected on a basis of the aforementioned detected opening/closing speed of the movable panel 15, for example. In the same manner, according to the present embodiment, the opened/closed position (state) of the sunshade 16 is detected by the detection of the rotation position As of the sunshade drive motor 36 by the pulse sensor 38. Alternatively, in a case where only a sensor for detecting the opening/closing speed of the sunshade 16 or the rotation speed of the sunshade drive motor 36 is provided, the opened/closed position of the sunshade 16 may be detected on a basis of the aforementioned detected opening/closing speed of the sunshade 16, for example.

According to the aforementioned embodiment, the interlock operation switch 40 for the interlock operation of the movable panel 15 and the sunshade 16 may be omitted. Then, the movable panel 15 may independently perform the opening and closing operation by the panel operation switch 29 and the sunshade 16 may independently perform the opening and closing operation by the shade operation switch 39.

According to the aforementioned embodiment, the control apparatus is applied to the sunroof apparatus 10 including the movable panel 15 that performs the pop-up operation. Alternatively, for example, the control apparatus may be applied to a sunroof apparatus in which the movable panel 15 performs the slide operation while being tilted-up or a sunroof apparatus in which the movable panel 15 performs the slide operation under the fixed panel 13 (i.e., a so-called inner slide operation).

According to the aforementioned embodiment, the sunshade 16 of rolling type is applied. Alternatively, for example, the sunshade of sliding type made of plate member may be applied. In addition, according to the aforementioned embodiment, the movable panel 15 of the sunroof apparatus 10 is applied. Alternatively, a movable panel i.e., a window glass, for a power window apparatus may be applied.

According to the aforementioned embodiment, the distance between the preceding member serving as one of the movable panel 15 and the sunshade 16 which should be positioned ahead of the succeeding member serving as the other of the movable panel 15 and the sunshade 16 which should be position behind the preceding member in each of the opening direction and the closing direction is basically prevented from being smaller than the predetermined distance. Even in a case where the distance between the succeeding member and the preceding member is smaller than the predetermined distance, the succeeding member is inhibited from further approaching the preceding member. Accordingly, the possibility of establishment of the reversal position relation between the preceding member and the succeeding member in each of the opening direction and the closing direction may be reduced.

According to the aforementioned embodiment, each of the panel control unit 20 and the sunshade control unit 30 includes the change device changing the distance between the movable panel 15 and the sunshade 16 based on a position of the preceding member in each of the opening direction and the closing direction (relative to each of the opening position and the closing position).

Accordingly, in a case where the preceding member is arranged at a position where the reversal position relation is unlikely to be established, for example, the preceding member is arranged or substantially arranged at a position corresponding to the fully open state or the fully closed state, the separation distance is changed or specified to be zero or substantially zero so as to avoid the succeeding member from stopping unnecessarily away from the preceding member. In addition, the opening or closing operation of the succeeding member is continued until the succeeding member catches up with the preceding member, thereby bringing the succeeding member to the fully open state or the fully closed state.

In addition, according to the aforementioned embodiment, each of the panel control unit 20 and the sunshade control unit 30 includes the forced control device (forced device) driving one of the panel drive motor 26 and the sunshade drive motor 36 to stop the operation of the succeeding member in each of the opening direction and the closing direction (relative to each of the opening position and the closing position) in a case where the succeeding member reaches the predetermined stop position, and the priority control device (device) selecting one of the control device and the forced device to stop the operation of one of the movable panel 15 and the sunshade 16, the operation of the one of the movable panel 15 and the sunshade 16 being stopped at one of the first position and the second position whichever the one of the movable panel 15 and the sunshade 16 reaches first, the first position where the control device stops the operation of the succeeding member relative to each of the opening position and the closing position, the second position where the forced device stops the operation of the succeeding member relative to each of the opening position and the closing position.

Accordingly, in a case where the succeeding member reaches the predetermined stop position, for example, the specific position at which the operation mode thereof is switched, prior to the stop of the opening operation or the closing operation of the succeeding member by the control device, the forced device is operated to stop the opening operation or the closing operation of the succeeding member at the predetermined stop position.

Further, according to the aforementioned embodiment, each of the panel control unit 20 and the sunshade control unit 30 includes the prohibition device selectively driving one of the panel drive motor 26 and the sunshade drive motor 36 to prohibit the operation of the succeeding member relative to each of the opening position and the closing position from starting in a case where the distance between the preceding member and the succeeding member relative to each of the opening position and the closing position is smaller than the predetermined distance.

Accordingly, in a case where the succeeding member is stopped in a state where the distance between the succeeding member and the preceding member is smaller than the predetermined distance, the prohibition device operates so that the succeeding member is inhibited from unnecessarily starting the opening operation or the closing operation. Accordingly, compared to a case where the opening operation or the closing operation of the succeeding member is immediately stopped after once started, the possibility of establishment of the reversal position relation may be reduced.

According to the present embodiment, the establishment of the reversal position relation between the movable panel 15 and the sunshade 16 in the opening direction or the closing direction between the fully closed position and the fully open position may be restrained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control apparatus comprising:
a first drive device driving a movable panel that moves between an opening position and a closing position to selectively open and close an opening portion configured to be formed at a vehicle;
a first detection device detecting a state of the movable panel that moves to one of the opening position and the closing position;
a second drive device driving a sunshade configured to be provided at the vehicle and moving between an opening position and a closing position;
a second detection device detecting a state of the sunshade that moves to one of the opening position and the closing position; and
a control device controlling the first drive device to stop an operation of a succeeding member serving as the movable panel configured to be positioned behind a preceding member serving as the sunshade relative to each of the opening position and the closing position, the preceding member being configured to be positioned ahead of the succeeding member relative to each of the opening position and the closing position, in a case where a distance between the movable panel and the sunshade in the opening direction becomes smaller than a predetermined distance on a basis of a position of the movable panel detected by the first detection device and a position of the sunshade detected by the second detection device, and the control device controlling the second drive device to stop an operation of a succeeding member serving as the sunshade configured to be positioned behind a preceding member serving as the movable panel relative to each of the opening position and the closing position, in a case where a distance between the movable panel and the sunshade in the closing direction becomes smaller than a predetermined distance on a basis of a position of the movable panel detected by the first detection device and a position of the sunshade detected by the second detection device.

2. The control apparatus according to claim 1, further comprising a change device changing the distance between the movable panel and the sunshade based on a position of the preceding member relative to each of the opening position and the closing position.

3. The control apparatus according to claim 1, further comprising:
a forced device driving one of the first drive device and the second drive device to stop the operation of the succeeding member relative to each of the opening position and the closing position in a case where the succeeding member reaches a predetermined stop position; and
a device selecting one of the control device and the forced device to stop the operation of one of the movable panel and the sunshade, the operation of the one of the movable panel and the sunshade being stopped at one of a first position and a second position whichever the one of the movable panel and the sunshade reaches first, the first position where the control device stops the operation of the succeeding member relative to each of the opening position and the closing position, the second position where the forced device stops the operation of the succeeding member relative to each of the opening position and the closing position.

4. The control apparatus according to claim 1, further comprising a prohibition device selectively driving one of the first drive device and the second drive device to prohibit the operation of the succeeding member relative to each of the opening position and the closing position from starting in a case where the distance between the preceding member and the succeeding member relative to each of the opening position and the closing position is smaller than the predetermined distance.

* * * * *